(12) United States Patent
Sakuraba

(10) Patent No.: US 7,712,065 B2
(45) Date of Patent: May 4, 2010

(54) AUTOMATIC LAYOUT METHOD AND AUTOMATIC LAYOUT DEVICE

(75) Inventor: Yuichi Sakuraba, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 111 days.

(21) Appl. No.: 11/580,329

(22) Filed: Oct. 13, 2006

(65) Prior Publication Data
US 2007/0089080 A1    Apr. 19, 2007

(30) Foreign Application Priority Data
Oct. 18, 2005    (JP) .............. 2005-302512

(51) Int. Cl.
G06F 17/50    (2006.01)
G06F 9/45    (2006.01)

(52) U.S. Cl. ............... 716/8; 716/9; 716/10; 716/11; 700/28; 700/29; 700/30; 700/31; 700/32; 700/33; 700/95; 700/96; 700/97; 700/115; 700/116; 700/117; 700/135; 700/159; 700/160

(58) Field of Classification Search ............... 716/8–11; 715/200–277; 700/28–33, 95–97, 115–117, 700/135, 159–160
See application file for complete search history.

(56) References Cited

U.S. PATENT DOCUMENTS

| | | | | |
|---|---|---|---|---|
| 5,847,968 A | * | 12/1998 | Miura et al. ............ | 716/8 |
| 6,748,574 B2 | * | 6/2004 | Sasagawa et al. ........ | 716/9 |
| 7,114,139 B2 | * | 9/2006 | Kabuo ..................... | 716/6 |
| 7,348,982 B2 | * | 3/2008 | Schorr et al. ............ | 345/441 |
| 2005/0108668 A1 | | 5/2005 | Kabuo | |
| 2006/0028659 A1 | * | 2/2006 | Nishikawa ............... | 358/1.2 |

FOREIGN PATENT DOCUMENTS

CN    1619549 A    5/2005

OTHER PUBLICATIONS

Examination Report (along with English translation) dated Sep. 14, 2007.
Nakashima, "Automatic Layout of Object Diagrams Based on Object Oriented Methodology," vol. 39:3282-3293 (1998).

* cited by examiner

Primary Examiner—Thuan Do
Assistant Examiner—Nghia M Doan
(74) Attorney, Agent, or Firm—Sughrue Mion, PLLC

(57) ABSTRACT

An automatic layout method for performing an automatic layout of components on a diagram, the automatic layout method includes: generating a layout engine control object based on an operation of an application program; selecting at least one layout engine object from a plurality of layout engine objects for calculating coordinates of the components by different algorithms, at least one layout engine object being selected based on an instruction of the application program by the layout engine control object; and creating the diagram by the application program based on the coordinates calculated by the selected layout engine object.

2 Claims, 4 Drawing Sheets

AUTOMATIC LAYOUT METHOD AND AUTOMATIC LAYOUT DEVICE

This application claims foreign priority based on Japanese Patent application No. 2005-302512, filed Oct. 18, 2005, the content of which is incorporated herein by reference in its entirety.

BACKGROUND OF THE INVENTION

1. Field of the Invention

The present invention relates to an automatic layout method and an automatic layout device for laying out components of a diagram when the diagram showing a graphic structure such as a network block diagram is created.

2. Description of the Related Art

Diagrams, including a network configuration diagram, configured with components (nodes) and connections for connecting the components have been frequently used. When the diagram has many nodes or connections, it becomes difficult to lay out the diagram manually, so that the diagram is drawn by using some layout function.

In such an automatic layout, various kinds of algorithms have been known. For instance, a spring model, a magnetic spring model or a circle method is exemplified (for instance, see "Automatic layout of object diagram based on object oriented methodology", Nakajima et al., Journal of Information Processing Society of Japan, Vol. 39, No. 12, pp. 3282, 1998).

FIG. 4 is a block diagram showing one example of an automatic layout device of a related art.

In FIG. 4, a computer 4 is an ordinary type and includes at least a central processing unit (CPU) 41, an input section (a keyboard, a touch panel or the like) 42, a display section (CRT: Cathode-Ray Tube., LCD: Liquid Crystal Display, or the like) 43, and a storing section (a hard disk, a memory or the like) 44.

In the storing section 44, node data 441, a layout calculating section 442 and an application section 443 are stored. In the node data 441, data necessary for calculating an automatic layout including positions of nodes, connecting relation between the nodes, shapes, colors and sizes of the nodes are stored. The layout calculating section 442 is a program for calculating coordinates of the nodes by using one of prescribed algorithms on the basis of these node data. The application section 443 is a program for displaying a desired configuration diagram on the display section on the basis of the calculated result. The node data is previously inputted from the input section by a user.

The program sections shown in the storing section 44 in FIG. 4 are respectively operated by the CPU 41 as a program executing section.

As described above, in the automatic layout method and the automatic layout device of the related art, a designer employs a specific algorithm that is most suitable for a system (a configuration diagram desired to be displayed), and directly mounts it on the device. Accordingly, a problem arises that it is difficult to change a drawing method (algorithm for calculating layout).

SUMMARY OF THE INVENTION

The present invention has been made in view of the above circumstances, and provides an automatic layout method and an automatic layout device in which a drawing algorithm can be changed.

In some implementations, an automatic layout method of the invention for performing an automatic layout of components on a diagram, the automatic layout method comprising:

generating a layout engine control object based on an operation of an application program;

selecting at least one layout engine object from a plurality of layout engine objects for calculating coordinates of the components by different algorithms, said at least one layout engine object being selected based on an instruction of the application program by the layout engine control object; and creating the diagram by the application program based on the coordinates calculated by the selected layout engine object.

The automatic layout method of the invention further comprising:

generating a layout engine factory object when the layout engine control object determines that the layout engine object to be selected based on the instruction of the application program does not exist in the plurality of layout engine objects, and generating the layout engine object to be selected by the layout engine factory object.

In some implementations, an automatic layout device of the invention for performing an automatic layout of components on a diagram, the automatic layout device comprising:

an application executing section for operating an application program;

a plurality of layout calculating sections for calculating coordinates of the components by different algorithms; and a control section for selecting at least one layout calculating section from the plurality of layout calculating section based on an instruction of the application program, wherein the diagram is created based on the coordinates calculated by the selected layout calculating section.

The automatic layout device of the invention further comprising:

a generating section for, when the control section determines that the layout calculating section to be selected based on the instruction of the application program does not exist in the plurality of layout calculating sections, generating the layout calculating section to be selected.

According to the present invention, since a part for calculating the layout is implemented in a library format to realize generalization, and a new drawing method (algorithm) can be added to the library, when the layout is calculated, the algorithm can be changed to the algorithm that is most suitable for a system (a configuration diagram desired to be displayed).

DESCRIPTION OF THE PREFERRED EMBODIMENTS

Figure 1:
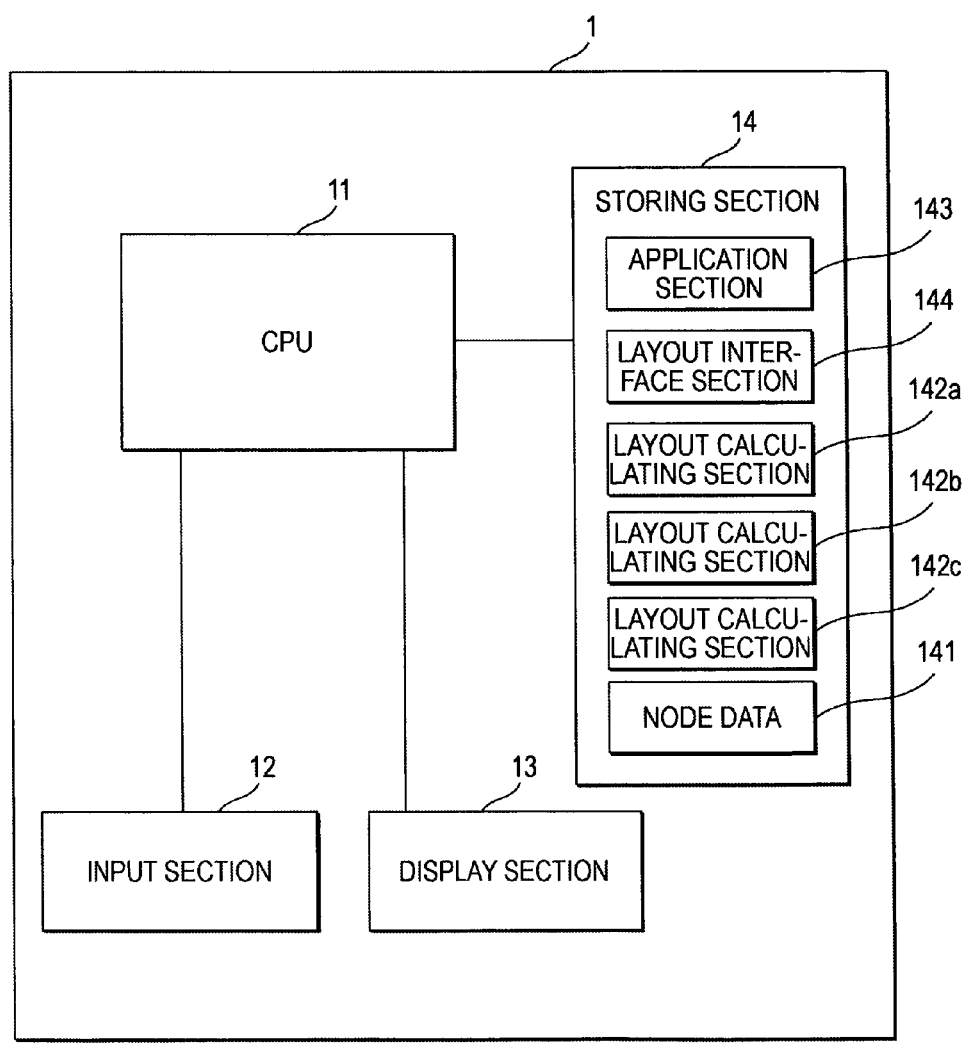
FIG. 1 is a block diagram showing one embodiment of an automatic layout device according to an embodiment of the present invention.

Now, by referring to the drawings, the present invention will be described below in detail. FIG. 1 is a block diagram showing one example of an automatic layout device according to an embodiment of the present invention.

In FIG. 1, a computer 1 is an ordinary type and includes at least a central processing unit (CPU) 11, an input section (a keyboard, a touch panel or the like) 12, a display section (CRT, LCD or the like) 13 and a storing section (a hard disk, a memory or the like) 14.

FIG. 1 is a block diagram for explaining a schematic structure. In the storing section 14, node data 141, layout calculating sections 142a, 142b and 142c, an application section 143 and a layout interface section 144 are shown.

The node data 141 is data necessary for automatically calculating a layout including positions of nodes, connecting relation between the nodes, and shapes, colors and sizes of the nodes.

The layout calculating sections 142a, 142b and 142c are a plurality of programs that respectively calculate the layouts by different algorithms on the basis of the node data.

The application section 143 is a previously loaded program for transmitting the node data to any of the layout calculating sections 142a, 142b and 142c, and displaying a desired configuration diagram on the display section 13 in accordance with the calculated result of any of the layout calculating sections 142a, 142b and 142c.

The layout interface section 144 is a program for transmitting and receiving data between the application section 143 and the layout calculating sections 142a, 142b and 142c.

The node data is previously inputted from the input section 12 by a user.

Figure 2:
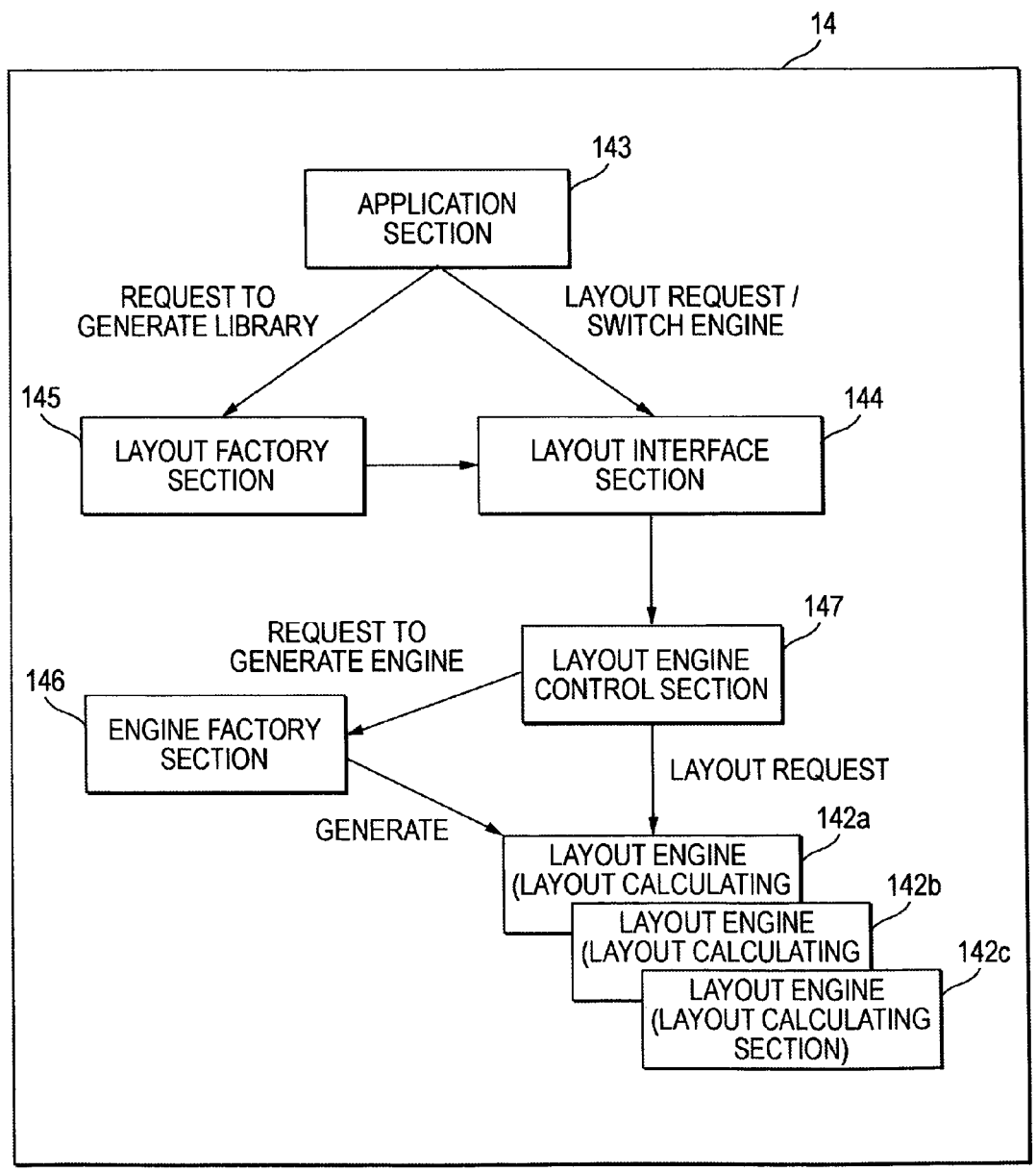
FIG. 2 is an explanatory view for explaining a detailed structure and an operation of the automatic layout device according to an embodiment of the present invention.

FIG. 2 is an explanatory view for explaining a detailed structure and operations of respective sections of the automatic layout device according to the embodiment of the present invention. FIG. 2 shows only the structure of the storing section 14 in FIG. 1.

In FIG. 2, the layout interface section 144 shown in FIG. 1, layout engines 142a, 142b and 142c (corresponding to the layout calculating sections shown in FIG. 1), a below-described layout engine control section 147 and an engine factory section 146 are referred to as a layout library. Generation and operation of the layout library will be described by referring to FIG. 2.

The generation means loading a program for performing a relevant duty in the storing section 14 and executing the program. As the program to be loaded, a program present in other computer connected to a network (not shown) may be loaded therefrom, or a program may be previously stored in the storing section 14 of the computer 1.

A layout factory section 145 is a previously loaded program, and as an operation, generates the layout interface section 144 in accordance with a request to generate a library of the application section 143.

The layout interface section 144 is the program loaded by the layout factory section 145 to transmit and receive data to and from the application section 143 as an operation. The layout interface section 144 transmits a layout request (a request to change the layout engine) of the application section 143 to the layout engine control section 147. The layout request (including designating information of the layout engine) of the application section 143 is generated in accordance with an instruction from the input section 12 by the user.

The layout engine control section 147 is a program loaded by the layout interface section 144. As an operation, the layout engine control section 147 controls a plurality of layout engines and transmits the layout request at least one of the layout engines in accordance with the layout request from the application section 143 supplied through the layout interface section 144.

The engine factory section 146 is a program for generating the layout engines. When a designated layout engine does not exist, the engine factory section 146 is loaded by the operation of the layout engine control section 147, and the layout engine factory section 146 operates to load and generate the layout engine as a plug-in program having a predetermined interface.

Any of the layout engines 142a, 142b and 142c operates to perform the layout calculation in accordance with a layout request of the layout engine control section 147 to calculate the coordinates of the nodes, and transmit the calculated result to the application section 143 through the layout interface section 144.

In this embodiment, an example having three layout engines is described, however, the present invention is not limited thereto.

The programs shown in the storing section 14 illustrated in FIGS. 1 and 2 are respectively operated by the CPU 11. These programs form an application executing section, a layout calculating section, a control section for controlling the layout calculating section, a generating section for generating the layout calculating section, and a layout interface section.

The above-described layout library is written by an object oriented language, and the sections of the storing section 14 respectively correspond to objects. The engine factory section 146 (object) can add a layout method (algorithm) during an operation by dynamically class-loading the layout engines (objects).

Figure 3:
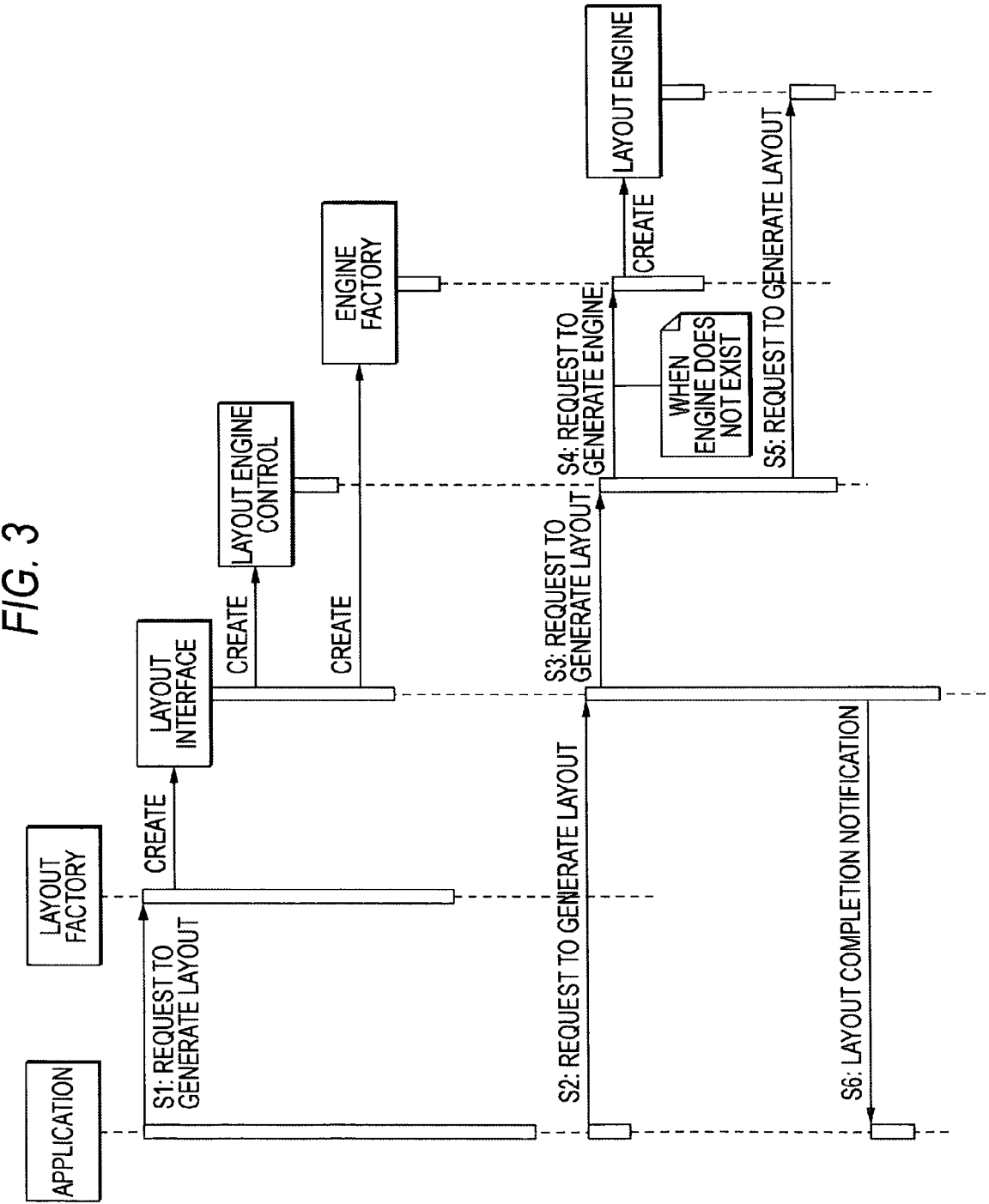
FIG. 3 is an explanatory view showing a flow of processes of an automatic layout method according to an embodiment of the present invention.
Figure 4:
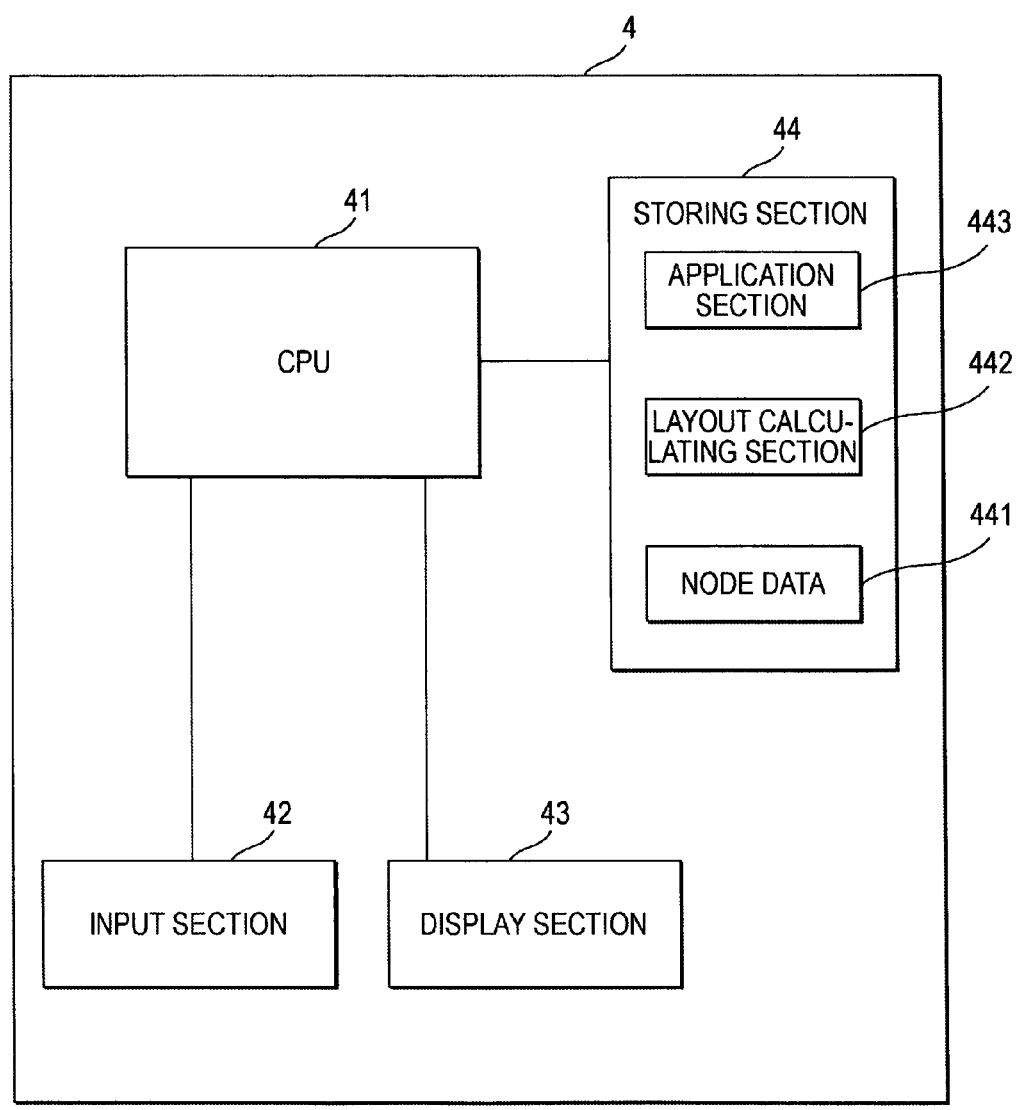
FIG. 4 is a block diagram showing one example of an automatic layout device of a related art.

FIG. 3 is an explanatory view showing a flow of processes of an automatic layout method according to the embodiment of the present invention.

FIG. 3 is a sequence diagram representing communication between the objects with time as a reference, in accordance with notation of UML (Unified Modeling Language). Now, the flow of the processes will be described below correspondingly to signs showing a communication sequence shown in FIG. 3.

(S1) An application allows a layout factory to generate the layout library. The layout factory generates a layout interface. The layout interface generates a layout engine control and an engine factory.

(S2) The application requests the layout interface of the layout of the nodes. For the request, position, size and connecting information of the nodes are supplied to the layout interface. A message (request) from the application is asynchronously carried out. Accordingly, the operation of the application can be prevented from being blocked by the processes of the layout interface or the layout engines or the like.

(S3) The layout interface transfers the layout request to the layout engine control. When the designated layout engine does not exist, the layout engine control requests the engine factory to generate the layout engine.

(S4) The engine factory generates the designated layout engine. At this time, a class-loading operation is dynamically carried out by using a function of the object oriented language.

(S5) The layout engine control requests the layout engine for the layout. The layout result shows the coordinates of the nodes.

(S6) The layout interface informs the application of the layout result as an event. The coordinates of the nodes as the layout result are all included in the event.

As described above, since the layout engines are generated by the class-loading operation, a layout function can be used for a general purpose.

Further, the algorithm of the layout can be dynamically switched to calculate the layout that is most suitable for a system (a configuration diagram desired to be displayed).

The present invention is not limited to the above-described embodiment and further includes many changes and deformations within a scope without departing the gist thereof.

For instance, when a state in which various kinds of small devices are installed in a field by using a radio LAN (Local Area Network) is considered, it is expected that such devices can be dynamically added to or deleted from a network. When the present invention is applied thereto, even if the devices are added or deleted, a layout on a control screen can be easily made so that a screen that is always easily viewed by a user can be achieved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An automatic layout method executable in an automatic layout device for performing an automatic layout of components on a diagram, the automatic layout method comprising:

generating a layout engine control object based on an operation of an application program;

selecting at least one layout engine object from a plurality of different layout engine objects for calculating coordinates of the components by different algorithms, said at least one layout engine object being selected based on an instruction of the application program by the layout engine control object;

creating the diagram for components layout by the application program based on the coordinates of the components calculated by the selected layout engine object; and generating a layout engine factory object when the layout engine control object determines that the layout engine object to be selected based on the instruction of the application program does not exist in the plurality of different layout engine objects, and generating the layout engine object to be selected by the layout engine factory object.

2. An automatic layout device for performing an automatic layout of components on a diagram, the automatic layout device comprising:

an application executing section for operating an application program;

a plurality of different layout calculating sections for calculating coordinates of the components by different algorithms;

a control section for selecting at least one layout calculating section from the plurality of layout calculating sections based on an instruction of the application program;

wherein the diagram for components layout is created based on the coordinates of the components calculated by the selected layout calculating section; and a generating section for, when the control section determines that the layout calculating section to be selected based on the instruction of the application program does not exist in the plurality of different layout calculating sections, generating the layout calculating section to be selected.

* * * * *